United States Patent
Farrell et al.

(10) Patent No.: US 9,624,048 B2
(45) Date of Patent: Apr. 18, 2017

(54) STRUCTURES AND METHODS USING AN INTEGRATED RUFFLE TO REDUCE DUST RELEASED DURING EMPTYING OF BULK BAGS

(71) Applicant: Blastcrete Equipment Company, Anniston, AL (US)

(72) Inventors: William J. Farrell, Anniston, AL (US); Dennis Limbaugh, Vestavia, AL (US); Robert Carlson, Bluffton, SC (US)

(73) Assignee: Blastcrete Equipment Company, Anniston, AL (US)

( * ) Notice: Subject to any disclaimer, the term of this patent is extended or adjusted under 35 U.S.C. 154(b) by 0 days.

(21) Appl. No.: 14/576,541

(22) Filed: Dec. 19, 2014

(65) Prior Publication Data
US 2015/0203289 A1  Jul. 23, 2015

Related U.S. Application Data

(60) Provisional application No. 61/918,078, filed on Dec. 19, 2013.

(51) Int. Cl.
| | | |
|---|---|---|
| B65D 33/02 | (2006.01) |
| B65G 65/40 | (2006.01) |
| B65D 88/16 | (2006.01) |
| B65D 88/54 | (2006.01) |
| B65D 90/22 | (2006.01) |

(52) U.S. Cl.
CPC ......... *B65G 65/40* (2013.01); *B65D 88/1668* (2013.01); *B65D 88/54* (2013.01); *B65D 90/22* (2013.01)

(58) Field of Classification Search
CPC .... B65G 65/40; B65D 88/54; B65D 88/1668; B65D 90/22
USPC ............................................... 414/810; 383/6
See application file for complete search history.

(56) References Cited

U.S. PATENT DOCUMENTS

| | | | | |
|---|---|---|---|---|
| 3,961,655 | A | * | 6/1976 | Nattrass ............. B65D 88/1618 222/181.3 |
| 4,182,386 | A | | 1/1980 | Alack |
| 4,207,937 | A | * | 6/1980 | Sandeman ......... B65D 88/1681 383/117 |
| 4,301,848 | A | * | 11/1981 | Beaven .............. B65D 88/1681 383/20 |
| 4,364,424 | A | | 12/1982 | Nattrass |
| 4,527,716 | A | * | 7/1985 | Haas ................... B65B 69/0091 222/105 |
| 4,627,781 | A | | 12/1986 | Borgner |
| D296,078 | S | * | 6/1988 | Nelson ........................... D3/272 |
| 4,946,291 | A | * | 8/1990 | Schnaars ............ B65D 88/1618 383/109 |

(Continued)

OTHER PUBLICATIONS

SPRIOFLOW Global Powder Handling Solutions, "Bulk Bag Discharging", Apr. 2010, CDM, United States of America.

*Primary Examiner* — Charles A Fox
*Assistant Examiner* — James Buckle, Jr.
(74) *Attorney, Agent, or Firm* — Cahn & Samuels, LLP (57) ABSTRACT

An improved bulk bag for containing dry bulk, granular, and/or pulverized materials designed to prevent dust cloud escape and migration during discharge/emptying of the materials in bulk bag using an integrated dust barrier skirt affixed to the exterior of the bulk bag and telescopable to create a dust cloud curtain prior to content discharge.

19 Claims, 7 Drawing Sheets

(56) References Cited

U.S. PATENT DOCUMENTS

| | | | |
|---|---|---|---|
| 4,948,265 A * | 8/1990 | Futerman | B65D 88/1618 383/109 |
| 4,966,311 A | 10/1990 | Taylor | |
| 5,314,250 A * | 5/1994 | Lee | B65D 33/14 383/104 |
| 5,685,644 A | 11/1997 | Taylor | |
| 5,938,338 A * | 8/1999 | McDonough | B65D 88/1618 220/495.06 |
| 5,944,070 A | 8/1999 | Schmidt et al. | |
| 5,984,850 A | 11/1999 | Derby | |
| 6,293,318 B1 | 9/2001 | Schmidt et al. | |
| 6,415,927 B1 * | 7/2002 | Stone | B65D 19/06 206/600 |
| 7,125,168 B2 * | 10/2006 | La Fleur | B31B 19/36 383/111 |
| 7,476,265 B2 | 1/2009 | Firman | |
| 8,678,652 B1 * | 3/2014 | Nattrass | B65D 88/1631 383/119 |
| 2003/0235349 A1 * | 12/2003 | Ricahrdson, Jr. | B65D 88/1618 383/16 |
| 2005/0040017 A1 | 2/2005 | Kinnunen et al. | |
| 2008/0050211 A1 | 2/2008 | Showalter | |
| 2008/0283524 A1 * | 11/2008 | Kosich | B65D 88/1612 220/9.1 |
| 2011/0311165 A1 * | 12/2011 | Lommerts | B65D 88/1687 383/6 |
| 2013/0156350 A1 * | 6/2013 | Turner | B65D 33/00 383/12 |
| 2014/0307983 A1 * | 10/2014 | Limbaugh | B65D 88/1612 383/6 |

\* cited by examiner

STRUCTURES AND METHODS USING AN INTEGRATED RUFFLE TO REDUCE DUST RELEASED DURING EMPTYING OF BULK BAGS

This patent application claims priority of U.S. Provisional Patent Application No. 61/918,078, filed Dec. 19, 2013 which is hereby incorporated by reference in its entirety.

I. FIELD OF THE INVENTION

This invention relates to reduction of dust created during the emptying process of bulk bags containing comminuted/granular material. The purpose of this assembly is to mitigate deleterious environmental effects resulting from uncontrolled dust dispersal generated when emptying a bulk bag filled with a powdery material. The invention is directed to preserving worker's health, reducing the risk potential for fire/explosions, and reducing accumulating dust deposits on nearby equipment.

II. BACKGROUND OF THE INVENTION

The economy is driven in part by the transport of goods and materials from one location to another. The use of durable and inexpensive containers for transporting certain materials has grown over the years. For example bulk containers, commonly known as bulk bags, have been widely accepted for use in receiving, storing, transporting, and discharging flowable dry materials of various types. Bulk Bags provide an economical and efficient means to load, pack, store, and discharge a wide range of particulate materials, such as chemical feedstocks, silicates, and mineral powders, building materials such as cement, sand, and cinder ash, and granulated food materials such as grains, cereals, flours, sugars, nuts, and so on.

The preferred material employed in early modern bulk bags was polyvinyl chloride (PVC). While providing strength, durability and flexibility, PVC was replaced by polypropylene because of it was more durable, reliable, and resilient. Polypropylene also possesses improved chemical resistance. Bulk bags are now typically made of woven polypropylene. Bulk bags are generally of rectangular form featuring four side panel construction but may possess cross-sectional alternative tubular geometries and perimetric configurations, e.g. polygonal or circular/cylindrical construction. Typical bulk bags also incorporate integrated lifting loops sized and adapted to cooperate with conventional lifting equipment, e.g., hoists, cranes, forklift truck lifting tines, etc. The lifting loops are employed to manipulate and move a bag to and from a select destination, e.g., a filling station, a transport pallet, or a discharge device/hopper. Many variations of bulk containers exist such as those illustrated in U.S. Pat. Nos. 5,685,644, 6,220,755 and 6,179,467.

In the context of bulk bag discharge, one common technique relies on gravity to empty a bag once it has been moved over the opening of a discharge bin/hopper and the bottom of the bag is pierced or cut. The bag, for example may be lifted from a transport pallet using a forklift by engaging the lifting loops with the tines, positioning the bulk bag over a discharge opening of an underlying hopper and dropping the bag onto an integrated piercing/puncture element. The bag bottom is cut open and the contents discharged directly into the receiving bin/hopper. Exemplary devices of this nature are depicted in U.S. Pat. Nos. 6,293,318 and 5,405,053.

In bulk bag content discharge operations, particularly when involving material comprising fine comminuted/pulverized particles, creates a dust cloud which can present a danger for fire/explosion, a potential health hazard, and a deleterious environment for machinery. Industrial dust explosions and fires are not uncommon regardless of the otherwise innocent nature of the material involved. Concerns relating to dust and combustion are well known in the chemical industry but also exist in other seemingly less dangerous industries, as for example, in the food processing industry, e.g., sugar, flour, and grain, in the building products industry, e.g., sawdust and cement, and the textile industry, e.g., cotton and fibers. Powders that are normally quite stable in bulk form, when dispersed as a dust cloud, in the worst case, are combustible and become explosive. In in lesser concentrations, unabated dust exposure constitutes a potential health risk to personnel in the vicinity of the content receiving port/bin/chute/hopper and causes unnecessary mechanical wear and damage that may adversely impact the functional integrity of proximate equipment.

Indeed, the dangers being so recognized have led to governmental and organizational dust abatement standards issued, for example, by the National Fire Protection Association (NFPA), the Occupational Safety & Health Administration (OSHA) and other national and international bodies. Consequently, care must be exercised when discharging powdered/granulated materials stored and/or transported in bulk bags to avoid creation of an undesirable dust cloud.

Regardless of the foregoing risks, bulk bags remain one of the most efficient and economical containers for transporting large, specific amounts of granulated/powered materials. With the continued and a projected increase in use of bulk bags, it is important to minimize such potential risks.

In response to the problem, dust remediation systems have been developed as associated with the discharge equipment that rely on relatively expensive and complex vacuum systems and the like. However, a need still exists for a relatively inexpensive, uncomplicated, easily utilized solution for abatement of dust cloud migration associated with bulk bag discharge.

III. SUMMARY OF THE INVENTION

It is an object of the present invention to provide a solution to existing problems in the art.

It is another object of the present invention to provide dust cloud mitigation particularly adapted for discharging comminuted/pulverized materials.

It is a further object of the present invention to provide a relatively simple expedient compatible with a range of bulk bag discharge systems that effectively and economically reduces dust cloud migration into the immediate surrounding environment.

It is yet another object of the present invention to provide a system and method for bulk bag discharge employing a conformable physical barrier to prevent escape of dust from the receiving port of the collector bin/hopper.

A still further object of the present invention to provide an improved structure that provides an inexpensive and effective solution to escape of a dust cloud during bulk bag content discharge operations.

These and other objects are satisfied by a bulk bag for a particulate material, providing dust control during content discharge into a receiving device with a receiving port of select dimension, the improved bulk bag comprising: a bag body having at least one side panel defining a first edge and an oppositely disposed second edge, a top panel, and a bottom panel, said top panel being secured to said first edge and said bottom panel being secured to said second edge of the at least one side panel to form a tubular receptacle for retaining particulate material, said side panels being formed a strong, flexible, woven material and said bottom panel being piercable to permit content discharge; at least one engaging element disposed proximate to said first edge and adapted to cooperate with a hoist lifting system for raising and lowering the bag body; an integrated skirt having a bag body engaging first skirt edge and an oppositely disposed telescopically displaceable second skirt edge extendable from a first bag body engaging position to a second receiving port covering position, where said second receiving port covering position projects beyond said second edge and overlaps the receiving port, said skirt incorporating a radially inward directed compression element to urge the skirt against the receiving port and releasably compress thereagainst where the skirt defines a continuous barrier between said bottom panel and the receiving port to prevent escape of contain dust from the receiving port.

Still other objects are satisfied by a method for discharging a bulk bag for a particulate material, providing dust control during content discharge into a receiving device with a receiving port of select dimension where the bag has a body with a side panel defining a first edge and an oppositely disposed second edge, a top panel, and a bottom panel, where the top panel is secured to the first edge and the bottom panel is secured to the second edge of the panel to form a tubular receptacle for retaining particulate material, the bottom panel being piercable to permit content discharge, the bag including at least one engaging element disposed proximate to the first edge and adapted to cooperate with a hoist lifting system for raising and lowering the bag body, an integrated skirt having first edge coextensive with and secured to the bag body and an oppositely disposed telescopically displaceable second edge extendable from a first bag engaging position to a second receiving port covering position, where the integrated skirt in the second receiving port covering position projects beyond the second edge and overlaps the receiving port, the skirt incorporating a radially inward directed compression element for urging the skirt against the receiving port where the skirt defines a continuous barrier between the bottom panel and the receiving port to maintain any dust within the receiving port, the method comprising the steps of: lifting a bulk bag with an integrated skirt; positioning the bulk bag with the integrated skirt over a receiving receptacle defining an receiving port, telescoping the integrated skirt over the receiving port to establish a dust barrier, and discharging the content of the bulk bag.

At its most simple level, the invention incorporates an integrated skirt or ruffle element secured to the bulk bag that is telescopable lengthwise and may also be radially expandable to achieve a dimensional cross-section sufficient to cover and be compressed against an entire content receiving bin/hopper opening. Preferably, the skirt/ruffle element is affixed (sewn, glued, mechanically fastened, etc.) around the entire circumference/side of the bulk bag exterior proximate to the bottom and features a compressing structure capable of urging the distal end of the skirt ruffle against the perimeter of the receiving bin/chute of an associated discharge station. To this end, the dust ruffle skirt can incorporate drawstrings disposed in channel established by a perimetric hem. Alternatively, the perimetric edge of the skirt may feature an inexpensive stretchable elastic type band or the like and integrated crimpable metal plates that following deformation, provides inward, radially directed hoop force to retain the skirt/ruffle against the discharge/receiving bin side wall during emptying operations. It is contemplated that the skirt/ruffle of this invention would be dimensioned to accommodate a discharge opening of any geometry up to a diameter of up to about six feet (72 inches).

In this detailed description, references to "one embodiment", "an embodiment", or "in embodiments" mean that the feature being referred to is included in at least one embodiment of the invention. Moreover, separate references to "one embodiment", "an embodiment", or "embodiments" do not necessarily refer to the same embodiment; however, neither of such embodiments are mutually exclusive, unless so stated, as should be readily apparent to those skilled in the art. Thus, the invention can include any variety of combinations and/or integrations of the embodiments described herein.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the root terms "include" and/or "have", when used in this specification, specify the presence of stated features, steps, operations, elements, and/or components, but do not preclude the presence or addition of at least one other feature, step, operation, element, component, and/or groups thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

For definitional purposes and as used herein "connected" or "attached" includes physical, whether direct or indirect, affixed or adjustably mounted, as for example, the integrated skirt is connected to the bulk bag component either directly or through adhering, sewing, or other securing fastening means. Thus, unless specified, "connected" or "attached" is intended to embrace any operationally functional connection.

Skirt, as used herein, contemplates and includes a band of flexible material that may be generally flat, corrugated/ruffled or pleated, in any form that provides an integrated, extendable barrier structure possessing the functional attributes described in connection with the illustrated embodiments.

The term loops, lifting loops, handles, etc. are synonymous, interchangeable and is not limited as a means for securing, lifting and moving a bulk bag.

As used herein "substantially," "generally," "slightly" and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

In the following description, reference is made to accompanying drawings which are provided for illustration purposes as representative of specific exemplary embodiments in which the invention may be practiced. Given the following description of the specification and drawings, the apparatus and methods should become evident to a person of ordinary skill in the art. It is to be understood that other embodiments can be utilized and that structural changes based on presently known structural and/or functional equivalents can be made without departing from the scope of the invention.

IV. BRIEF DESCRIPTION OF THE DRAWINGS

Similar reference characters denote corresponding features consistently throughout the attached drawings.

V. DETAILED DESCRIPTION OF THE DRAWINGS

With reference now to the drawings, in particular to FIGS. 1-7, thereof, apparatuses and methods using an integrated skirt to reduce dust cloud formation during discharging of bulk bags, embodying features, principles, and concepts of various exemplary embodiments of the improved bulk bag using an integrated skirt will be described.

Figure 1:
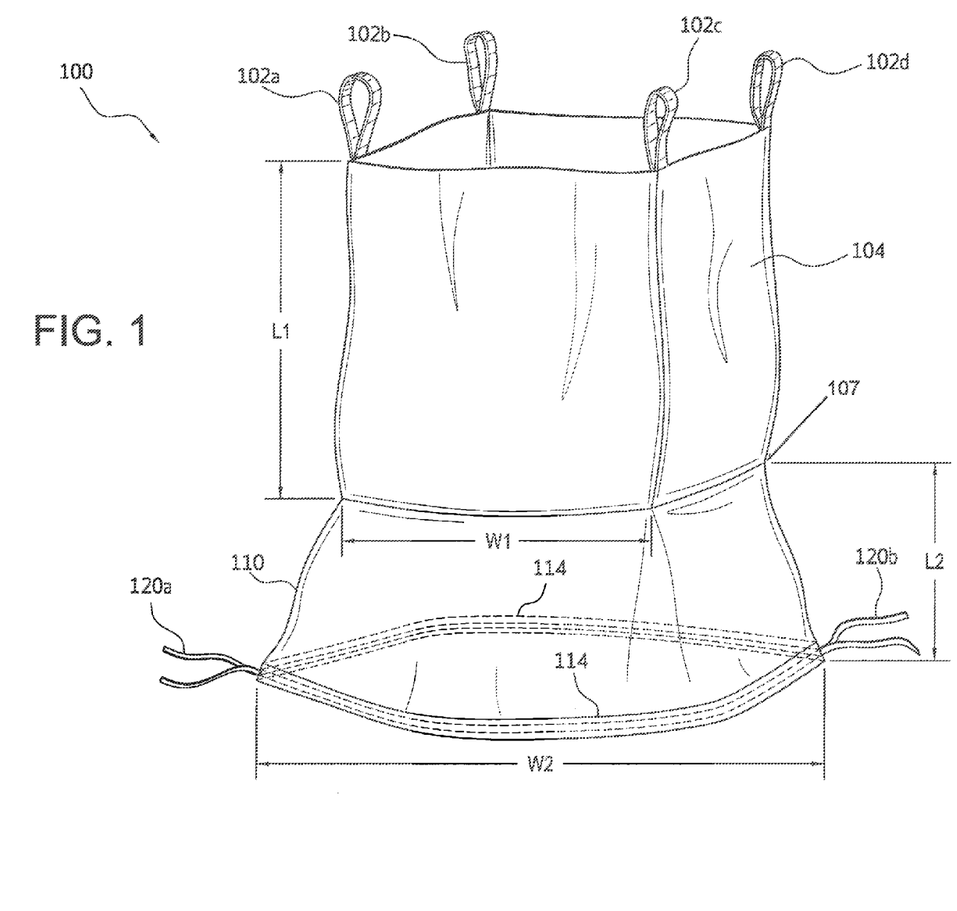
FIG. 1 illustrates a perspective view of an improved bulk bag with an integrated skirt in the extended position and incorporating a plurality of cinching drawstring ties according to one embodiment of the present invention.

To assist in understanding the various embodiments of the improved bulk bag using an integrated skirt, reference can first be made FIG. 1. FIG. 1 illustrates a perspective view of a first embodiment of an improved bulk bag 100 with an open integrated skirt 110 and incorporating a plurality of drawstring ties 120a and 120b disposed in receiving channels formed along the hem of the skirt at its lower edge. The improved bulk bag 100 includes a bag body 104 with a quadrilateral (square, in this case) cross-sectional configuration with a plurality of loops 102a, 102b, 102c, and 102d, disposed to project above the upper bag edge at each corner. Affixed to by appropriate means (sewing, gluing, heat welding, zippering, snaps, etc.) to the bulk bag body 104 and disposed proximate to the bottom bag edge thereof is the upper edge of an integrated skirt 110 featuring a skirt hem 114 and retaining drawstring ties 120a and 120b at the lower edge thereof.

The present invention of the improved bulk bag 100 can be made for the industry standard size for bulk cargo bags, such as for containing from two-three thousand pounds (1-1½ tons) of particulate materials, The improved bulk bag 100 is formed from a strong, powder impervious polymeric material providing some flexibility and, preferably, chemically resistance. A woven polypropylene or polyethylene is suitable for but even more suitable is a material possessing such properties but in addition, possesses biodegradability to meet solid waste disposal concerns. Similarly, the loops 102a, 102b, 102c, and 102d must possess adequate strength and tear resistance to permit a full bulk bag to be mechanically manipulated.

FIG. 1 illustrates the seam junction 107 joining the bag body and upper edge of the skirt with the skirt flaring outwardly to its lower border/edge formed by the skirt hem 114. The skirt hem 114 preferably possesses sufficient width (about two inches) to provide a reliable and reasonably rugged skirt perimeter. The hem may be shorter but preferably is of a length corresponding substantially to the length of the entire lower skirt edge. In order to achieve the stated functionality of the invention, the opening established by the hem of the skirt must dimensionally accommodate a bag-content-receiving-opening of an underlying bin/hopper. To this end, when the bulk bag and discharge hopper are not of matching/precisely mating dimensions, the skirt is provided with some outward flaring to permit both telescopic and radial expansion relative to the bag body.

The exemplary embodiment of FIG. 1 depicts of the invention with preferred dimensions. The length of the bag body 104 is designated as "L1" and is greater than then width of the bag body 104 shown as "W1" (preferably about thirty-five (35) inches). The length of the integrated skirt 110, "L2", preferably is greater than W1 (e.g., at least about forty-eight (48) inches, and skirt width, "W2" corresponds at a minimum to W1 but preferably is greater (up to two times—72 inches) whereby the skirt tapers to the seam junction 107. In this manner the dust cloud mitigating integrated skirt 110 bulk bag can accommodate different discharge equipment incorporating different sized discharge openings and cross-sectional geometries.

Figure 2:
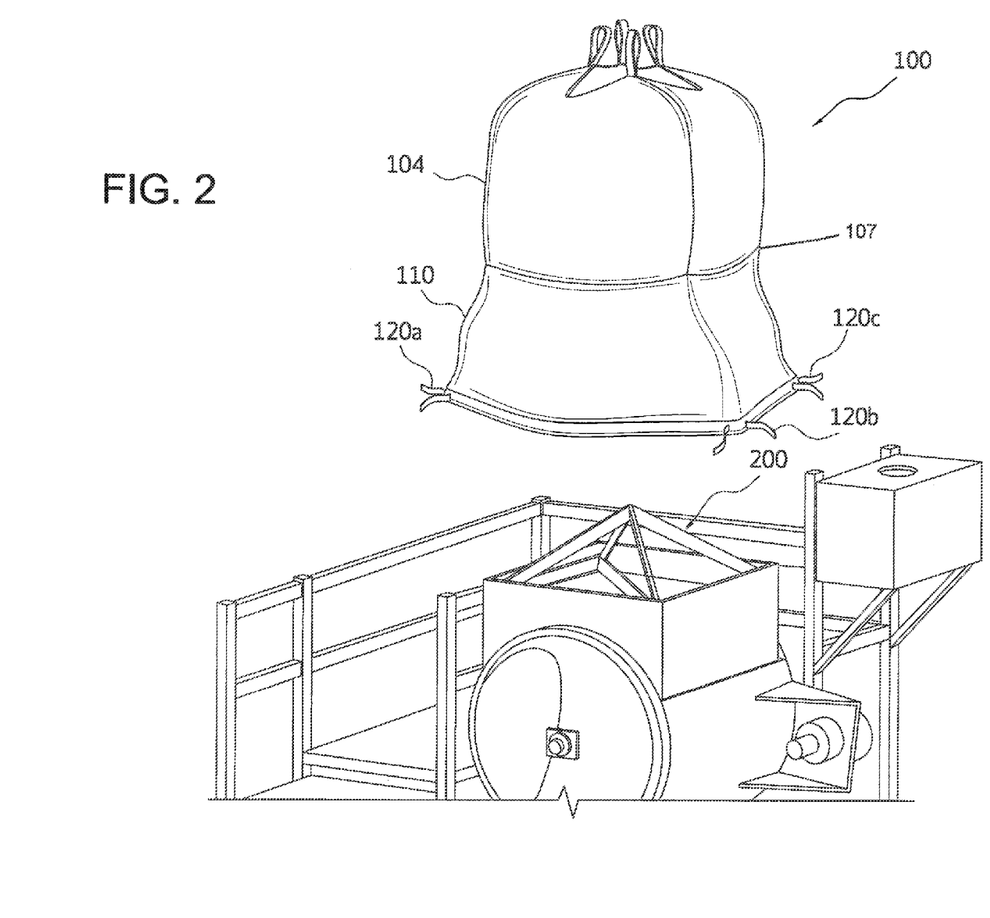
FIG. 2 illustrates a perspective view of the improved bulk bag of FIG. 1 positioned above a hopper with an integrated bag-piercing member disposed in the receiving port.
Figure 3:
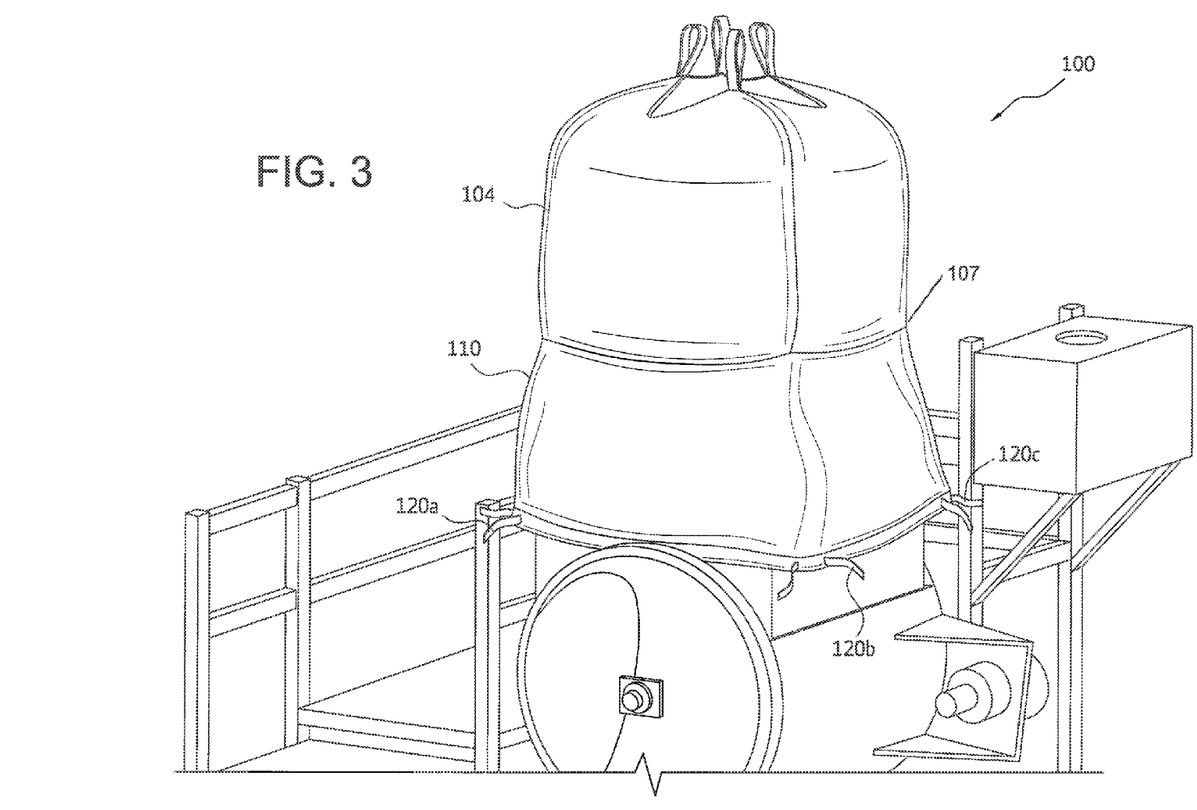
FIG. 3 illustrates a perspective view of the improved bulk bag of FIG. 1 with the skirt telescopically depending from the bag and overlapping the receiving port of the hopper.
Figure 4:
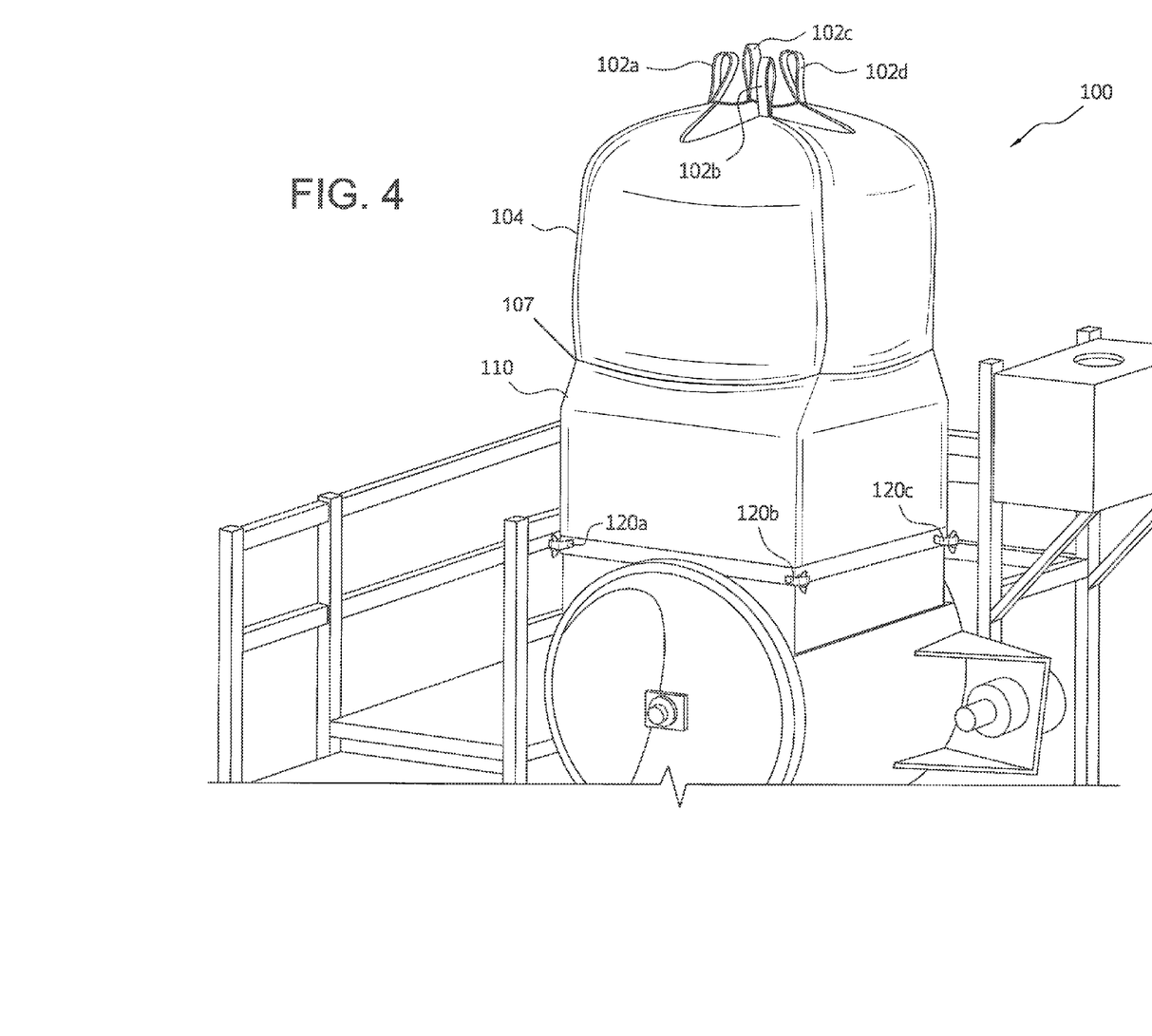
FIG. 4 is a perspective view of the improved bulk bag of FIG. 1 showing the integrated skirt compressibly engaging the hopper.

FIGS. 2 through 4 illustrate a content discharge sequence of the embodiment of FIG. 1. In FIG. 2 the improved bulk bag 100 is positioned over a hopper 200. The integrated skirt 110 has been displaced from its nested position against the bulk bag body to hang/depend from the lower edge thereof. In FIG. 3 the improved bulk bag 100 has been lowered over the hopper and integrated skirt 110 disposed over the hopper discharge chute. A plant operator then will tie drawstrings 120a,120b, and 120c to each other to compress the hem against the outer periphery of the hopper chute. The bag is then dropped onto the piercing element to puncture of the bag bottom and discharge the powdered bag content in a manner preventing the escape of a dust cloud from the hopper.

Figure 5:
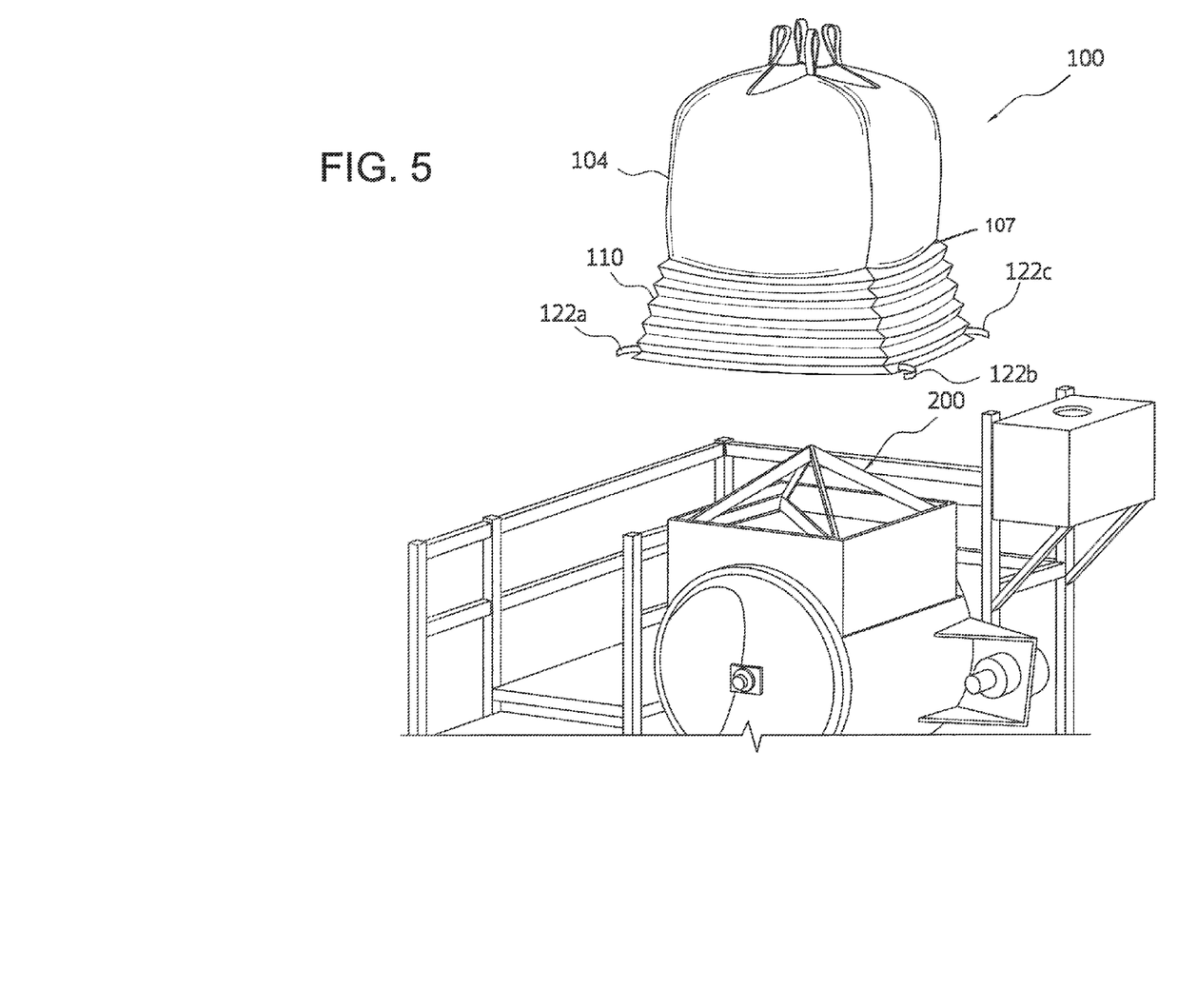
FIG. 5 illustrates a perspective view of an alternative embodiment of an improved bulk bag incorporating an expanded, accordion type incorporating crimpable/bendable metal strips at to the corners for compressible engaging the hopper.
Figure 6:
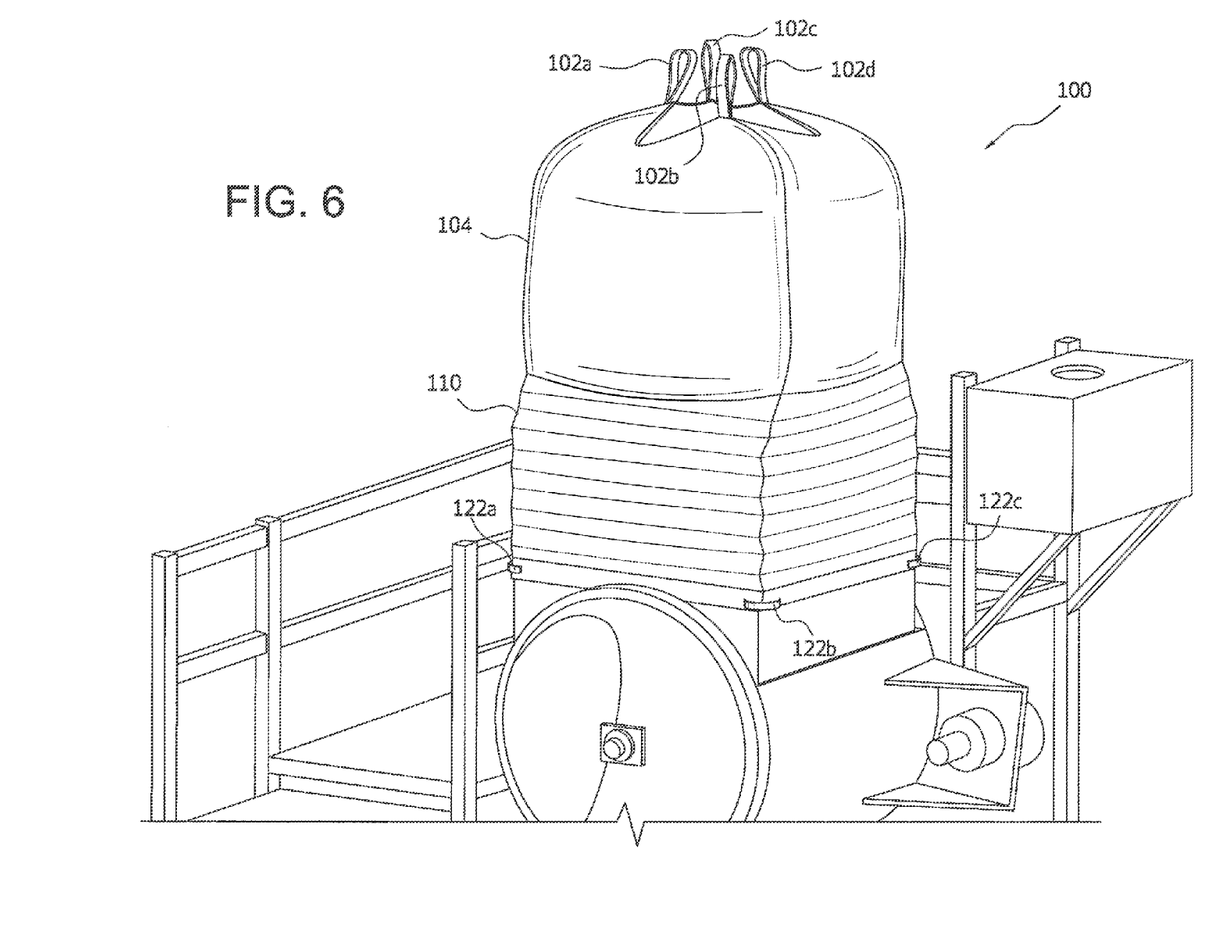
FIG. 6 illustrates a perspective view of the improved bulk bag of FIG. 5 showing the integrated skirt telescoped over and the metal strips compressibly engaging the hopper.

Referring to the embodiment of FIGS. 5 and 6, it differs from the foregoing embodiment particularly in the construction of the perimetric accordion telescopically extendable skirt 110 employing crimping metal clamps 122a, 122b, and 122c to secure the integrated skirt 110 to the underlying equipment prior to discharge. The metal bands are bent about the outer surface of the hopper receiving chute and manipulated by a plant operator to frictionally engage and secure the skirt to the hopper chute perimeter to establish the intended dust cloud barrier. In this embodiment, where the hopper discharge opening dimensionally corresponds to the bulk bag cross-sectional dimensions, the horizontally pleated accordion style skirt need not be expanded radially but only telescoped longitudinally to cover the hopper opening before dropping the bag onto the piercing mechanism to discharge it content.

Figure 7:
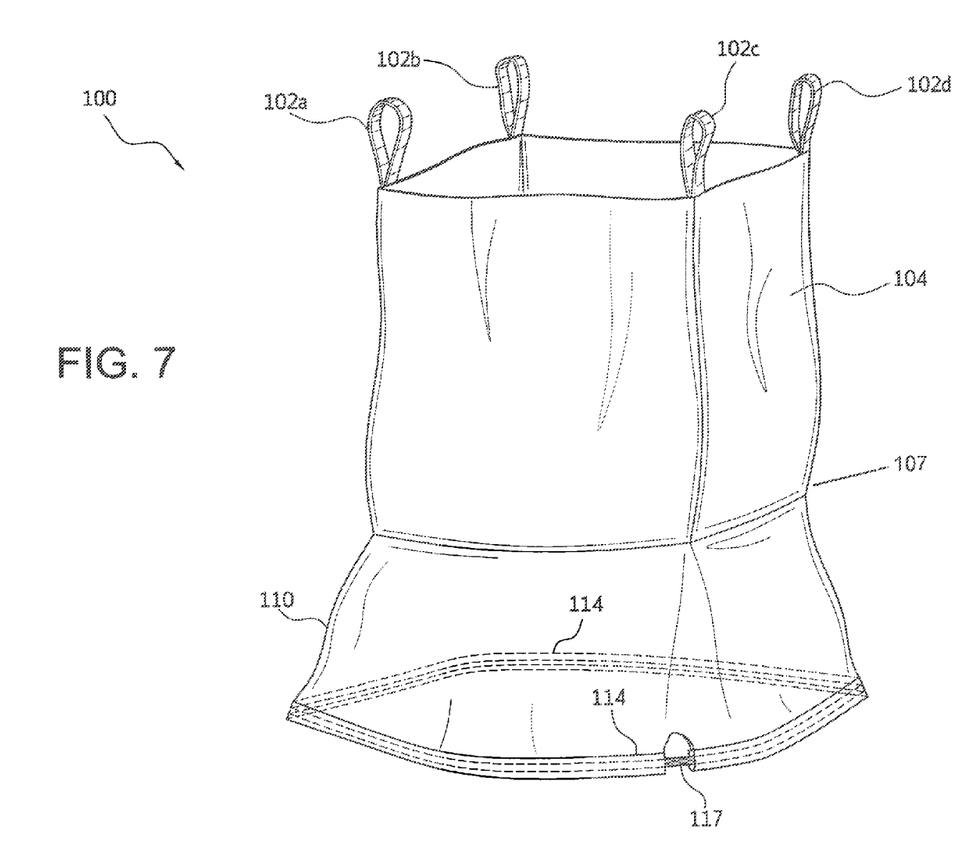
FIG. 7 illustrates a perspective view of a further embodiment of an improved bulk bag with a skirt incorporating an integrated elastic band.

FIG. 7 illustrates a further variation on the dust cloud remediating bulk bag of the present invention. In this embodiment, the lower edge of the integrated skirt 110 incorporates an integrated, elastic band 117, in this case within the skirt hem 114 in lieu of the above illustrated drawstrings. Being stretchable, the elastic band 117 is deployable by a plant employee to secure the skirt over the outer perimeter of the hopper prior to discharge of the bulk bag content.

Respective features of the illustrated embodiments may be combined in a different combinations as required by particular circumstances or preferences so as to provide the functionality of a bag incorporating its own deployable dust cloud curtain/barrier. It should be understood, therefore, that the invention is not limited to the specific embodiments disclosed herein, and that modifications and other embodiments of the invention are intended to be included within the scope of the invention. Those skilled in the art should now appreciate that various adaptations and modifications of the example and alternative embodiments described above can be devised without departing from the scope and spirit of the invention. Therefore, it is to be understood that, within the scope of the appended claims, the invention may be practiced other than as specifically described herein.

We claim:

1. An improved bulk bag for a particulate material, providing dust control during content discharge into a receiving device with a receiving port of select dimension, the improved bulk bag comprising:
    a) a bag body having at least one side panel defining a first edge and an oppositely disposed second edge, a top panel, and a bottom panel, said top panel being secured to said first edge and said bottom panel being secured to said second edge of the at least one side panel to form a tubular receptacle for retaining particulate material, said at least one side panel being formed a strong, flexible, woven material and said bottom panel being piercable to permit content discharge;
    b) at least one engaging element disposed proximate to said first edge and adapted to cooperate with a hoist lifting system for raising and lowering the bag body; and
    c) an integrated skirt having a bag body engaging first skirt edge and an oppositely disposed telescopically displaceable second skirt edge extendable from a first bag body engaging position to a second receiving port covering position, where
    said second receiving port covering position projects beyond said second edge and overlaps the receiving port, said skirt incorporating a radially inward directed compression element to urge the skirt against the receiving port and releasably compress thereagainst; and
    where the skirt defines a continuous barrier between said bottom panel and the receiving port to prevent escape of dust from the receiving port.

2. The improved bulk bag according to claim 1, where the bag body has a plurality of connected side panels and the skirt is connected thereto and lies against the side panels in the bag body engaging position.

3. The improved bulk bag according to claim 2, where the bag body has four side panels and the skirt is formed from a number of segments corresponding to the number of side panels.

4. The improved bulk bag according to claim 1, where the top panel provides a secure closure to seal the material in the bag during transport thereof.

5. The improved bulk bag according to claim 1, where the skirt is radially expandable from the bag body engaging position to the receiving port covering position.

6. The improved bulk bag according to claim 1, further comprising:
    a first element of a skirt securing member disposed on the at least one side panel and a second element of a releasable skirt securing member to releasably secure said skirt in said bag body engaging position when said first and second elements are engaged, and where the skirt is secured to and extends coextensively along said second edge.

7. The improved bulk bag according to claim 6, where the first and second elements are selected from the group consisting of buttons, zippers, hook and loop fasteners, hooks and eyes, and integrated elastic banding.

8. The improved bulk bag according to claim 7, where radially inward directed compression element is selected from the group consisting of elastic banding, drawstrings, matable hook and loop fasteners, adhesive stripping, and snaps.

9. The improved bulk bag according to claim 8, where radially inward directed compression element is disposed proximate to and formed integrally with the telescopable second skirt edge.

10. The improved bulk bag according to claim 1, where the engaging element comprises at least one pair of oppositely disposed loops affixed to and proximate of said first edge.

11. An improved bulk bag with a skirt for containing comminuted materials, having a plurality of panels, the panels formed of a strong, flexible material, the improved bulk bag comprising:
    a first panel, a second panel, a third panel and a fourth panel, the first panel, the second panel, the third panel, and the fourth panel joined vertically along the edges of the adjacent panel to form a quadrilateral shape;
    a fifth panel that can be joined to at least one edge of the first, second, third, and fourth panel to form a closable top;
    a sixth panel joined to the first, second, third, and fourth panel to form a closed bottom;
    a tubular covering made of a strong, flexible material affixed horizontally along the lower edges of the first, second, third and fourth panels to form an integrated skirt; and
    the integrated skirt including a discharge opening, the integrated skirt having a plurality of drawstring ties included within a lower edge of the integrated skirt; and
    the integrated skirt being expandable to cover and dimensionally conform to the outer perimeter of the underlying or associated equipment designed to remove materials from the discharge opening of the improved bulk bag and for containing comminuted materials within the one or more panels of the skirt.

12. The improved bulk bag according to claim 11, further comprising:
    a first drawstring access cutout centrally located along a lower edge of the integrated skirt, a second drawstring access cutout centrally located along a lower edge of the second panel, a third drawstring access cutout centrally located along a lower edge of the integrated skirt and a fourth drawstring access cutout centrally located along a lower edge of the second panel, the first second, third and fourth drawstrings being accessible through the respective first, second, third and fourth drawstring access cutouts for securing the integrated skirt against the outer perimeter of the underlying or associated equipment.

13. The improved bulk bag according to claim 12, wherein the skirt is to be radially expandable and telescopable to dimensionally conform to the outer perimeter of the underlying or associated equipment designed to remove materials from the discharge opening of the improved bulk bag and for containing comminuted materials within the one or more side panels and the integrated skirt.

14. The improved bulk bag according to claim 12, wherein the integrated skirt includes an elastic band provided within a hem formed in the lower edge of the integrated skirt, the elastic band being the fastening means within the integrated skirt for securing the integrated skirt against the outer perimeter of the underlying equipment.

15. The improved bulk bag according to claim 12, wherein the lower surface of the distal ends of the integrated skirt incorporates a fastening means for securing the integrated skirt onto the outer perimeter of the underlying or associated equipment designed to remove materials from the discharge opening of the improved bulk bag.

16. A method for discharging a bulk bag for a particulate material, providing dust control during content discharge into a receiving device with a receiving port of select dimension where the bag has a body with at least one side panel defining a first edge and an oppositely disposed second edge, a top panel, and a bottom panel, where the top panel is secured to the first edge and the bottom panel is secured to the second edge of the panel to form a tubular receptacle for retaining particulate material, the bottom panel being piercable to permit content discharge, the bag including at least one engaging element disposed proximate to the first edge and adapted to cooperate with a hoist lifting system for raising and lowering the bag body, an integrated skirt having first edge coextensive with and secured to the bag body and an oppositely disposed telescopically displaceable second edge extendable from a first bag engaging position to a second receiving port covering position, where the integrated skirt in the second receiving port covering position projects beyond the second edge and overlaps the receiving port, the skirt incorporating a radially inward directed compression element for urging the skirt against the receiving port where the skirt defines a continuous barrier between the bottom panel and the receiving port to maintain any dust within the receiving port, the method comprising the steps of:

lifting a bulk bag with an integrated skirt;
positioning the bulk bag with the integrated skirt over a receiving receptacle defining a receiving port;
telescoping the integrated skirt over the receiving port to establish a dust barrier; and
discharging the content of the bulk bag.

17. The method according to claim 16, further comprising the step of securing the integrated skirt against the receiving receptacle with the compression element.

18. The method according to claim 16, further comprising:

opening the integrated skirt covering by freeing at least one drawstring tie in the lower edges of the integrated skirt covering; and
securing and fastening the integrated skirt covering by tying at least one drawstring tie in a position onto the outer perimeter of the underlying or associated equipment.

19. The method according to claim 16, further including the step of radially expanding the telescopable skirt covering.

* * * * *